(12) United States Patent
Kucmerowski et al.

(10) Patent No.: US 7,620,167 B2
(45) Date of Patent: Nov. 17, 2009

(54) APPARATUS TO OVERRIDE THE REDIRECT OR REJECT FEATURE AT AN SIP END POINT

(75) Inventors: Dennis L. Kucmerowski, Delray Beach, FL (US); Mallikarjuna Samayamantry, Delray Beach, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

(21) Appl. No.: 11/524,823

(22) Filed: Sep. 21, 2006

(65) Prior Publication Data

US 2008/0112390 A1 May 15, 2008

(51) Int. Cl.
*H04M 3/42* (2006.01)

(52) U.S. Cl. .............. 379/212.01; 379/201.01; 379/211.01; 379/211.02

(58) Field of Classification Search ........... 370/352; 379/441, 265.02, 233, 235, 266.01
See application file for complete search history.

(56) References Cited

U.S. PATENT DOCUMENTS

| | | | | |
|---|---|---|---|---|
| 5,590,187 | A * | 12/1996 | Greenspan | 379/212.01 |
| 6,418,216 | B1 * | 7/2002 | Harrison et al. | 379/208.01 |
| 6,484,196 | B1 * | 11/2002 | Maurille | 709/206 |
| 6,856,616 | B1 * | 2/2005 | Schuster et al. | 370/352 |
| 6,857,072 | B1 * | 2/2005 | Schuster et al. | 713/160 |
| 6,870,830 | B1 * | 3/2005 | Schuster et al. | 370/352 |
| 7,283,516 | B1 * | 10/2007 | Ganesan et al. | 370/352 |
| 2003/0194994 | A1 * | 10/2003 | Svedberg | 455/417 |
| 2004/0082324 | A1 * | 4/2004 | Ayoub | 455/422.1 |
| 2005/0043014 | A1 * | 2/2005 | Hodge | 455/411 |
| 2005/0195802 | A1 * | 9/2005 | Klein et al. | 370/352 |
| 2006/0146737 | A1 * | 7/2006 | Ohrstrom Sandgren et al. | 370/261 |
| 2006/0177030 | A1 * | 8/2006 | Rajagopalan et al. | 379/142.07 |
| 2008/0037753 | A1 * | 2/2008 | Hofmann | 379/208.01 |

OTHER PUBLICATIONS www.carrollcommunications.com/ipoffice/5donotdisturb.html, p. 1 of 2.*
www.cisco.com/en/US/products/sw/voicesw/ps556/products_administration_guide, pp. 3-5 of 26.*
J.Rosenberg, H.Schulzrinne, G.Camarillo, and etc. Internet Engineering Task Force (Network Working Group), RFC 3261, pp. 20-25, Jun. 2002.*

* cited by examiner

*Primary Examiner*—Ahmad F Matar
*Assistant Examiner*—Khai N Nguyen

(57) ABSTRACT

In some embodiments, a do not redirect or reject call management system may include one or more of the following features: (a) a memory comprising, (i) a do not redirect or reject application that allows a caller to prevent a call recipient from redirecting or rejecting a call, and (b) a processor coupled to the memory that executes the do not redirect or reject application.

5 Claims, 8 Drawing Sheets

APPARATUS TO OVERRIDE THE REDIRECT OR REJECT FEATURE AT AN SIP END POINT

FIELD OF THE INVENTION

This invention relates generally to the field of telecommunication data management. Specifically to Session Initiation Protocol (SIP) networks and enabled devices. More specifically to SIP call management.

BACKGROUND OF THE INVENTION

In traditional circuit-switched networks, such as the Public Switched Telephony Network ("PSTN"), each user endpoint is connected to at most one switching system. In a business enterprise, a business telephone is connected to a single Private Branch Exchange ("PBX"). A PBX is an intelligent switching point within a circuit-switched network that is responsible for routing calls to a plurality of internal nodes or public destinations via a single PSTN switching system.

Newer telephony networks that employ packet-switching technologies are growing in popularity. In particular, packet-switched telephony networks that use the Internet Protocol (IP) as a network protocol for transmitting and receiving voice data are becoming more prevalent. These so-called Internet Telephony (IT) networks have the potential to offer new features and services that are currently unavailable to subscribers of circuit-switched telephony networks. Conceptually, IT Networks differ from the PSTN systems in that they generally transmit voice data exchanged between two subscriber endpoints, according to an IP format. More specifically, they encapsulate voice data into data packets, which are transmitted according to an IP format in the same manner as textual data is transmitted from one computer to another via the internet.

The Session Initiation Protocol (SIP) is one of several protocols that may be used with the Internet Protocol to support Internet Telephony applications. The SIP specification is defined in the Internet Engineering Task Force (IETF) Request for Comments (RFC) 3261, dated June 2002; the disclosure of which is incorporated herein by reference in its entirety. SIP is an application-layer control protocol for creating, modifying, and terminating sessions between networked endpoints, which are referred to as SIP Enabled Devices, User Agents or simply SIP endpoints.

As discussed above, SIP Enabled Devices implement a network communication protocol, wherein a communication session is established for two endpoints to transmit and receive data. As such, each SIP Device in a SIP network is assigned a unique SIP address or terminal name, which is defined in a SIP Universal Resource Identifier (URI). The format of a SIP URI is similar to that of an email address, which typically includes a user name "@" a domain name, for example "sip:alice@siemens.com." SIP URI data is placed into header fields of SIP messages, for example to identify a sender and a receiver of the SIP message. For secure communications, the SIP Specification also defines a SIPS URI, for example "sips:alice@siemens.com." Accordingly, when a SIPS URI is used the SIP Enabled Device associated with the SIP URI may implement an encryption protocol for transmitting data in a secure communication session. It should be noted that the SIPS URI protocol may be used interchangeably with SIP URI protocol.

The SIP communication protocol allows either a SIP server or another SIP communication end point to present a call to another SIP communication end point, such as a phone device, as a request. The SIP communication end point receiving this request may make the decision to answer based on other local settings, such as Call Forwarding, Do Not Disturb, Reject Call, or Call Deflect, at the end point. The decision could result in the call request being rejected.

In some SIP architectures it may be desirable to reduce the processing load on proxy servers that are responsible for routing requests, and improve signaling path robustness, by relying on redirection. Redirection allows servers to push routing information for a request back in a response to the client, thereby taking themselves out of the loop of further messaging for this transaction while still aiding in locating the target of the request. When the originator of the request receives the redirection, it will send a new request based on the URI(s) it has received. By propagating URIs from the core of the network to its edges, redirection allows for considerable network scalability.

Another common scenario occurs when the callee is currently not willing or able to take additional calls at the end system. A 486 (Busy Here) (SIP codes are described in detail in RFC 3261) should be returned in such a scenario. The response is passed to the INVITE server transaction, which will deal with its retransmissions. A UAS (user agent server) rejecting an offer contained in an INVITE should return a 488 (Not Acceptable Here) response. Such a response should include a Warning header field value explaining why the offer was rejected.

The disadvantage is the callee that redirects a call and provides an alternate destination, has no control on how that destination would treat the call from the caller. The result is that the caller is redirected to a destination that may not handle the call or may redirect the caller again and may not serve the intended purpose of the caller's call. Moreover, the caller may have an urgent need to only communicate with the original callee and must not be redirected. A possible scenario of this could be when the callee redirects all calls to a voice mail device when he/she sets the local phone feature of 'Do Not Disturb'. But the callee may wish to and have the authority to over-ride the 'Do Not Disturb' feature in order to speak directly with the original callee.

Therefore, it is desirable to have a system that allows a caller to override any redirect/reject local feature settings.

SUMMARY OF THE INVENTION

These and other drawbacks in the prior art are overcome in large part by a system and method according to embodiments of the present invention.

In some embodiments, a do not redirect or reject call management system may include one or more of the following features: (a) a memory comprising, (i) a do not redirect or reject application that allows a caller to prevent a call recipient from redirecting or rejecting a call, and (b) a processor coupled to the memory that executes the do not redirect or reject application.

In some embodiments, a method for preventing calls from being redirected or rejected may include one or more of the following steps: (a) initiating a call to a recipient having do not redirect or reject instructions, (b) initiating a redirect or reject instructions from a recipient's phone, (c) instructing the recipient's phone that it must accept the call based upon the do not redirect or reject instructions, (d) routing the call through an SIP network, (e) determining if a redirect recipient is available to take a redirected call, (f) redirecting the call if the redirect recipient is available.

In some embodiments, a machine readable medium comprising machine executable instructions may include one or more of the following features: (a) call instructions that route a call to a recipient, (b) redirect instructions that determine if the recipient has a redirect or reject instructions on their phone, and (c) do not redirect or reject instructions that override the redirect or reject instructions to route the call to the recipient.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
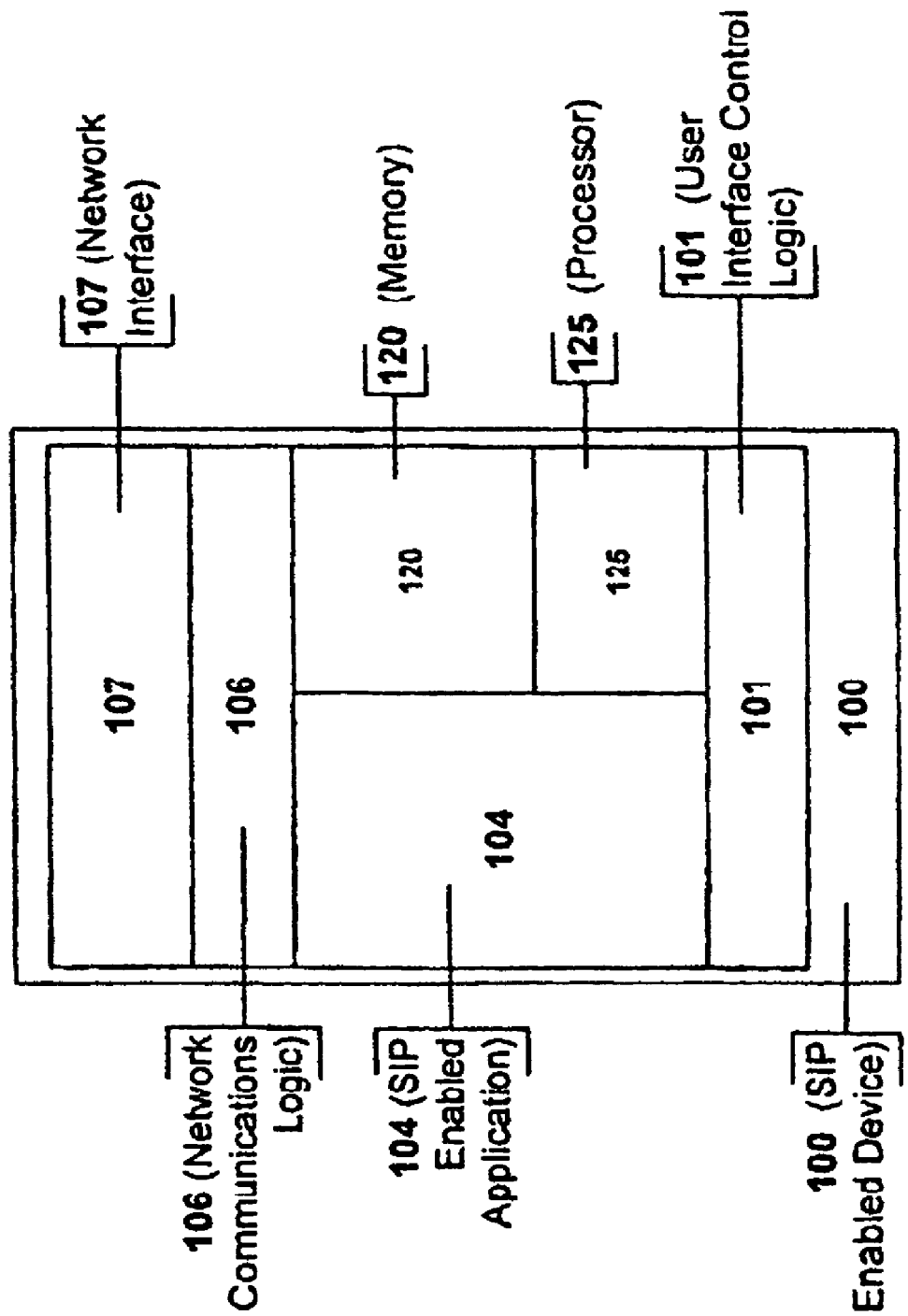
FIG. 1 shows a block diagram of software modules and hardware components implemented in a SIP Enabled Device in an embodiment of the present invention.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

Embodiments of the present invention detail a mechanism where a SIP call request will contain a directive to the receiving SIP communication end point to override its local setting that would have otherwise prevented the request from being accepted. The directive can be in the form of a new SIP header or as part of a call-info header that will be inserted into the call request by the request originator. The directive the inventors have labeled as "Do Not Redirect or Reject" when present in the call request can be interpreted by the receiving SIP end point as a directive to override any local feature settings such as Call Forwarding, Do Not Disturb, Reject Call or Call Deflect, that would have otherwise allowed the SIP end point to redirect the call.

Figure 2:
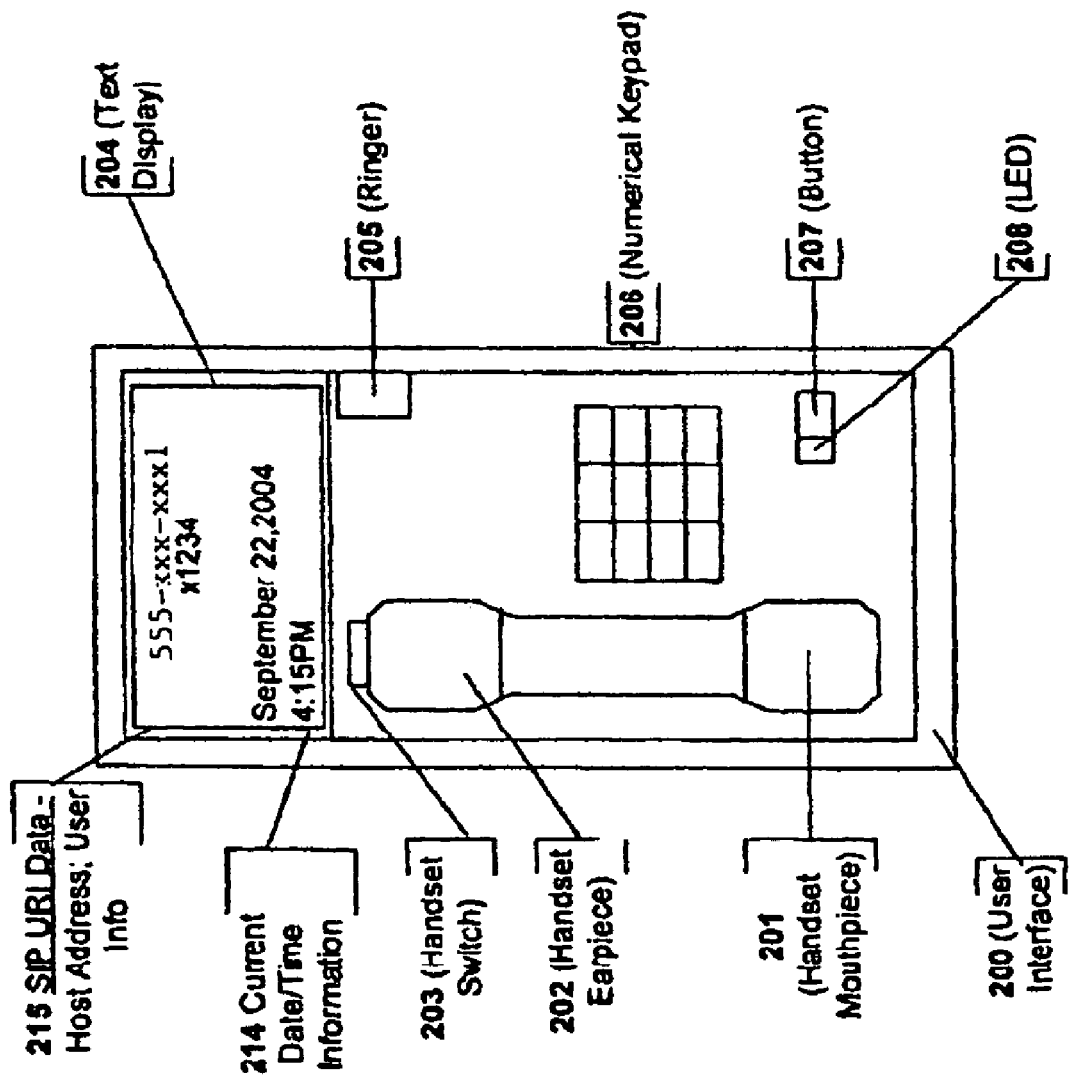
FIG. 2 shows a diagram of a user interface of a SIP Enabled Device in an embodiment of the present invention.
Figure 4:
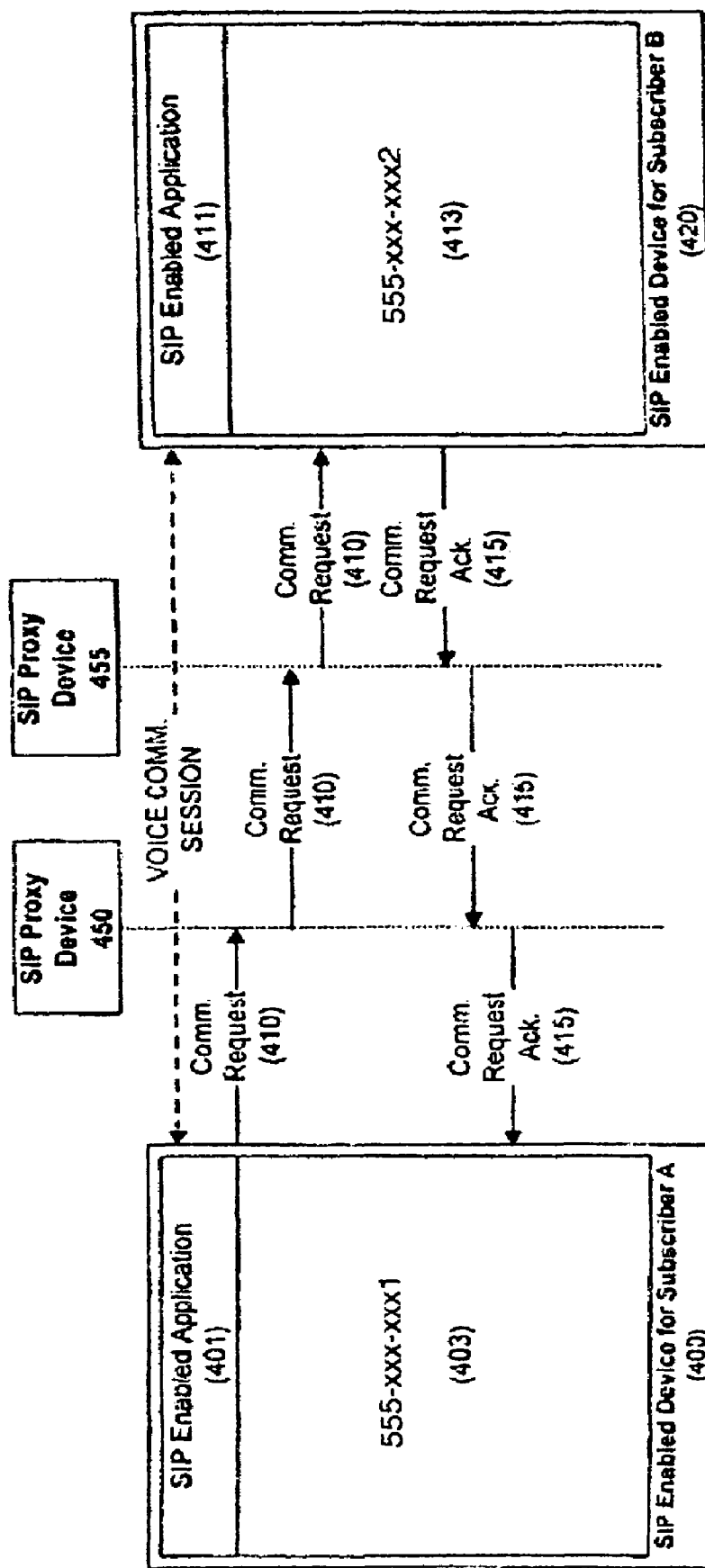
FIG. 4 shows a diagram of a communication session message exchange between two SIP Enabled Devices in an embodiment of the present invention.

Referring to FIG. 1, an SIP Enabled Device 100 is comprised of a User Interface Control Logic module 101 that interfaces with a user interface (an exemplary user interface is shown in FIG. 2 and discussed below). The User Interface Control Logic module 101 also interfaces with an SIP Enabled Application 104. SIP Enabled Application 104 implements a controller coordinating the various modules interacting within a single SIP Enabled Device 100 to send and receive SIP messages (as shown in FIG. 4 and discussed below). SIP Enabled Application 104 is also responsible for processing data from SIP communication messages and controlling additional functionality associated with SIP Enabled Device 100. SIP Enabled Application module 104 and the Network Communication Logic module 106 are modules that are stored on SIP enabled device 100 in memory 120 and executed by processor 125.

Further, the SIP Enabled Application 104 also interfaces with Network Communications Logic module 106 to send and receive non-SIP messages (not shown). Network Communications Logic module 106 implements data management and communications protocols for communicating with other network resources. Network Communications Logic module 106 interfaces with Network Interface 107, which is used to physically interface to a network (an exemplary network is shown in FIG. 3 and discussed below) that provides connectivity with other networked devices.

FIG. 2 shows an example of a User Interface 200 for an SIP Enabled Device used for Internet telephony applications. User Interface 200 is comprised of components including: handset mouthpiece 201, handset earpiece 202, handset switch 203, text display 204, ringer 205, and keypad 206, as well as user input button 207 and an LED indicator 208. A user physically manipulates the User Interface 200 components to operate the SIP Enabled Device 200 in a manner that is similar to a telephone.

SIP Enabled Device 200 may display data extracted from a SIP URI corresponding to the specific SIP Enabled Device. More specifically, one aspect of the SIP Enabled Device's SIP Enabled Application 104 is to maintain current date and/or time information 214 and display the data on text display 204. Also, SIP Enabled Application 104 may be configured to extract Host Address and/or User Information 215 data routing information, such as "555-xxx-xxx1" and "x1234" (Terminal Number and Terminal Name) data from the SIP URI (a listing of SIP Enabled device data specific to a terminal that is used to facilitate data transmissions) for the SIP endpoint.

Figure 3:
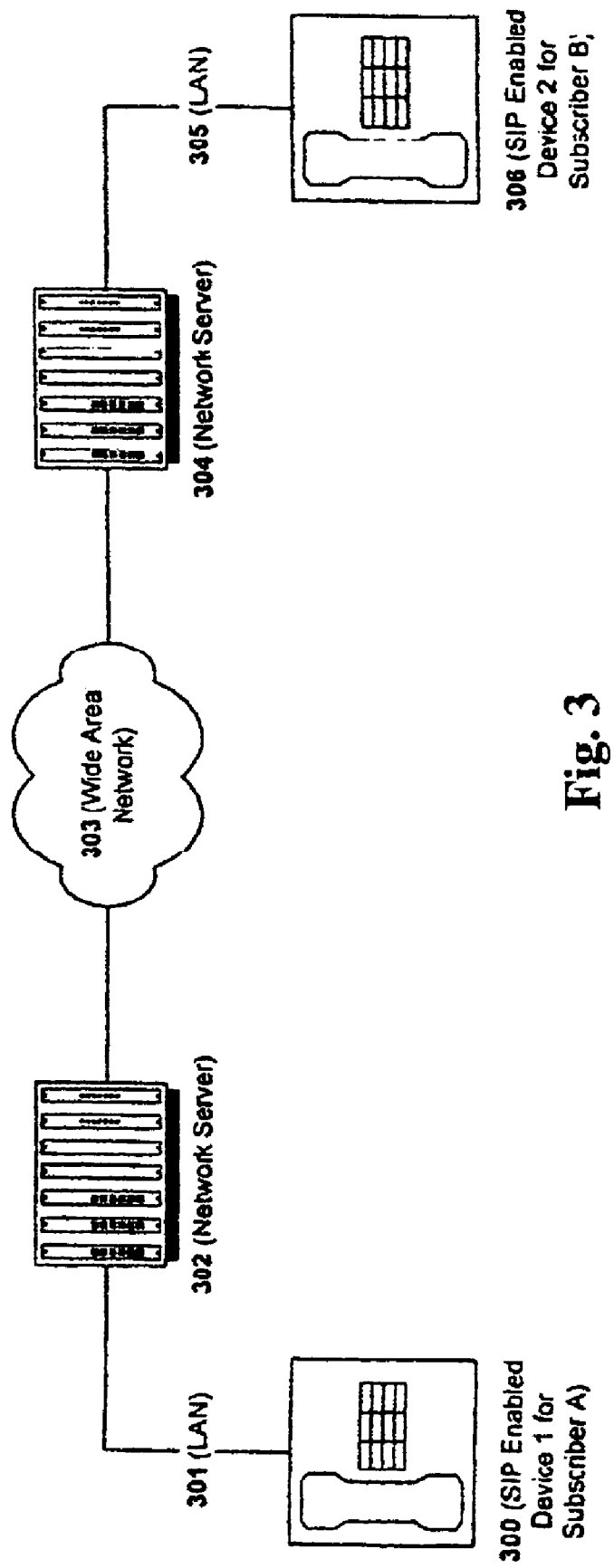
FIG. 3 shows an exemplary network of SIP Enabled Devices connected to a network for use in a SIP Enabled Internet Telephony application in an embodiment of the present invention.

FIG. 3 depicts an SIP Enabled Device network diagram illustrating exemplary devices that may be connected in a SIP network. In this example, subscriber A's SIP Enabled Device 300 is connected to a Local Area Network (LAN) 301. LAN 301, in turn, is connected to Network Server 302, which is also connected to Wide Area Network 303. Wide Area Network 303 is also connected to Network Server 304, wherein the Network Server 304 is connected to LAN 305, which is also connected to subscriber B's SIP Enabled Device 306. For illustrative simplicity, Network Servers 302 and 304 each perform the function of a SIP Proxy Server, a SIP Redirect Server, and a SIP Registrar; the functionality of which are defined in the SIP protocol specification. These Network Servers also contain additional functionality that is required for the SIP Enabled Devices to communicate; for example a Domain Name System (DNS) server, a Dynamic Host Control Protocol (DHCP) server, and a Lightweight Directory Access Protocol (LDAP) server.

FIG. 4 illustrates a generic exchange of data messages during SIP communication session creation. The SIP session shown results from subscriber A's SIP Enabled Device 400 initiating a voice call to subscriber B's SIP Enabled Device 420. For illustrative simplicity, only the SIP Enabled Application (401/411) for each SIP Enabled Device is shown. Prior to placing the voice call, subscriber A has configured the SIP Enabled Device 400 with a SIP address of "555-xxx-xxx1" 403 (host address data from the SIP URI) and subscriber B has configured the SIP Enabled Device 420 with a SIP address of "555-xxx-xxx2" 413.

During the SIP communication session, each SIP Enabled Application (401/411) uses these SIP addresses (403, 413) for routing data transmissions, and thereby establish and maintain a communication session. This is achieved by the respective SIP Enabled Applications interacting with a User Interface on the SIP Enabled Device to sample, encapsulate voice data for transmission on one SIP Enabled Device, while processing transmitted data packets and synthesizing the corresponding voice data on the other SIP Enabled Device. With regard to data transmission, subscriber A's SIP Enabled Application 401 communicates with subscriber B's SIP Enabled Application 411 by inserting the address "(555-xxx-xxx2)" 413 into the "To" header field of a SIP Communication Request (Comm. Request) message 410. Accordingly, in response subscriber B's SIP Enabled Application 411 prepares a Communication Request Acknowledgement message 415 inserting "(555-xxx-xxx1)" 403 into the "To" header field of a response message. (The message exchange between the SIP Enabled Devices 400 and 420 has been modified for the purposes of illustration and simplification, for a more detailed description of the actual SIP communication protocol refer to RFC 3261.)

Figure 5:
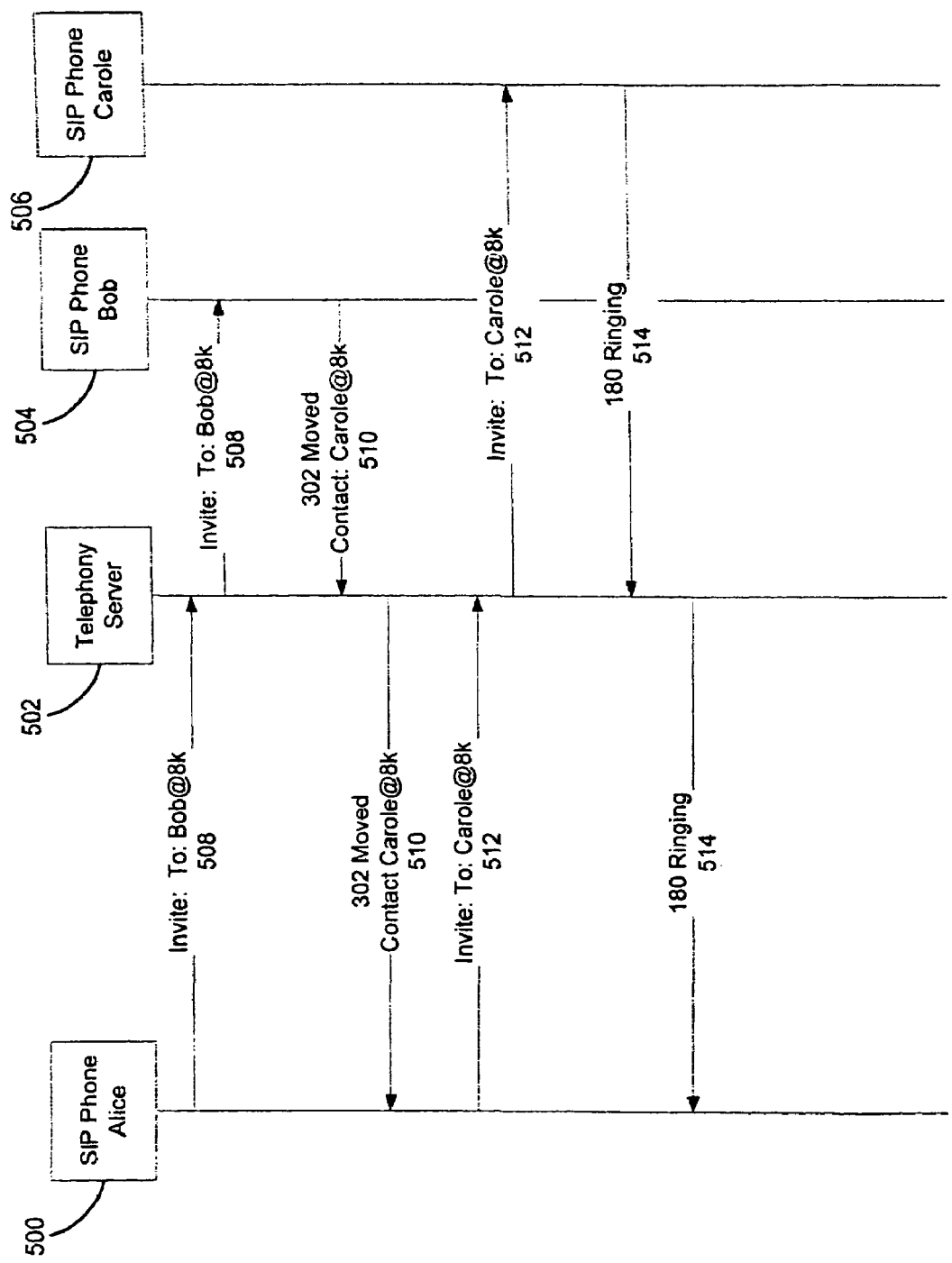
FIG. 5 shows a call flow for a redirected or rejected call.

With reference to FIG. 5, a call flow for a redirected or rejected call is shown. Presently, when Alice at phone 500 initiates a call to Bob invite 508 is routed to server 502 which then relays invite 508 to Bob's phone 504. The invite would be similar to the invite below.

---

INVITE sip: 555-xxxx-xxx2 @ 10.153.100.123 SIP/2.0
To: 555-xxxx-xxx2
sip: 555-xxxx-xxx2 @ 10.153.100.123:5060;user=phone>
From: <sip: 555-xxxx-xxx1 @ 10.152.67.102>;tag=test_tag_0008345221
Call-ID: 5919515411-8316973335595411-11-9184970552
CSeq: 1235 INVITE
Contact: sip: 555-xxxx-xxx2 @ 10.152.67.102:5060
Via:SIP/2.0/UDP10.152.67.102:5060;branch=
z9hG4bK_brancha_0023412706
MaxForwards: 70
Content-Type: application/sdp
Content-Length: 257
Alert-Info: <Bellcore-dr1>
v=0
o=MxSIP 0 2075461554 IN IP4 10.153.100.101
s=SIP Call
c=IN IP4 10.153.100.101
t=0 0
m=audio 5004 RTP/AVP 0 8 18 101
a=rtpmap:0 PCMU/8000
a=rtpmap:8 PCMA/8000
a=rtpmap:18 G729/8000
a=rtpmap:101 telephone-event/8000
a=fmtp:101 0-15
a=ptime:20

---

It is contemplated that server 502 can be most any server as discussed above without departing from the spirit of the invention. Bob has adjusted the local feature settings on his phone to indicate that he has moved temporarily. Thus, the requesting client should retry the request at the new address (es) given by the contact header field, in this case Carole. The Request-URI of the new request uses the value of the Contact header field in the response. Therefore Bob's phone 504 sends message 510 back to server 502 instructing server 502 to redirect Alice's call to Carole. Message 510 is then routed to Alice from server 502.

Alice can now resend her invite to Carole in hopes of reaching Bob with invite 512. Invite 512 is routed through server 502 to Carole's phone 506. Carole's phone begins ringing which initiates message 514 to be sent to server 502 and then to Alice. Code 180 signifies that the UA receiving the INVITE is trying to alert the user. While this system has worked well there are disadvantages. For example, what if Bob is not in Carole's office? What if Bob forgot he set the moved temporarily feature and Alice desperately needs to discuss an important project with Bob? This scenario is similar to a reject function except Alice would simply be told that she cannot reach Bob as discussed above.

Figure 6:
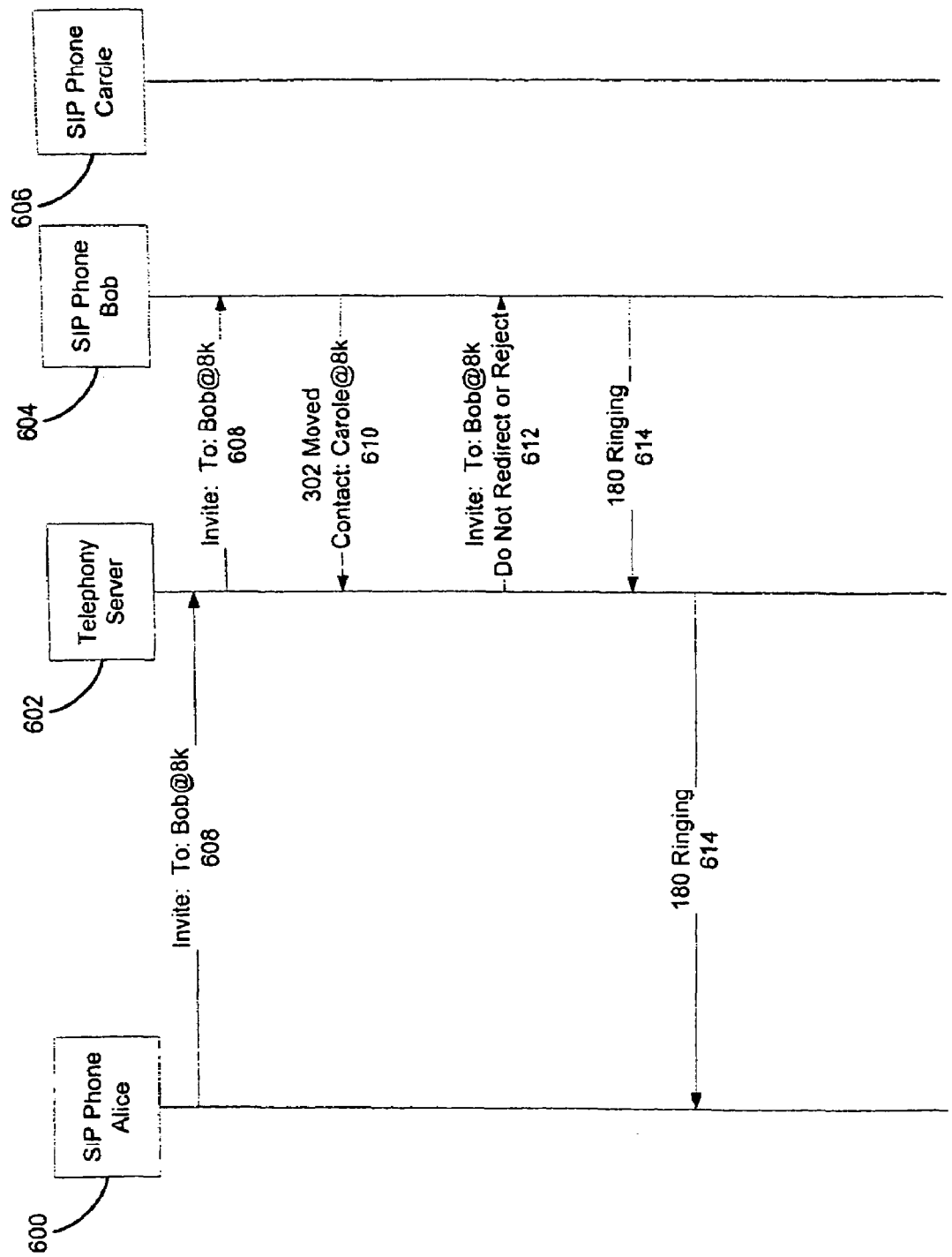
FIG. 6 shows a call flow for a do not redirect of reject call implementation in an embodiment of the present invention.
Figure 7:
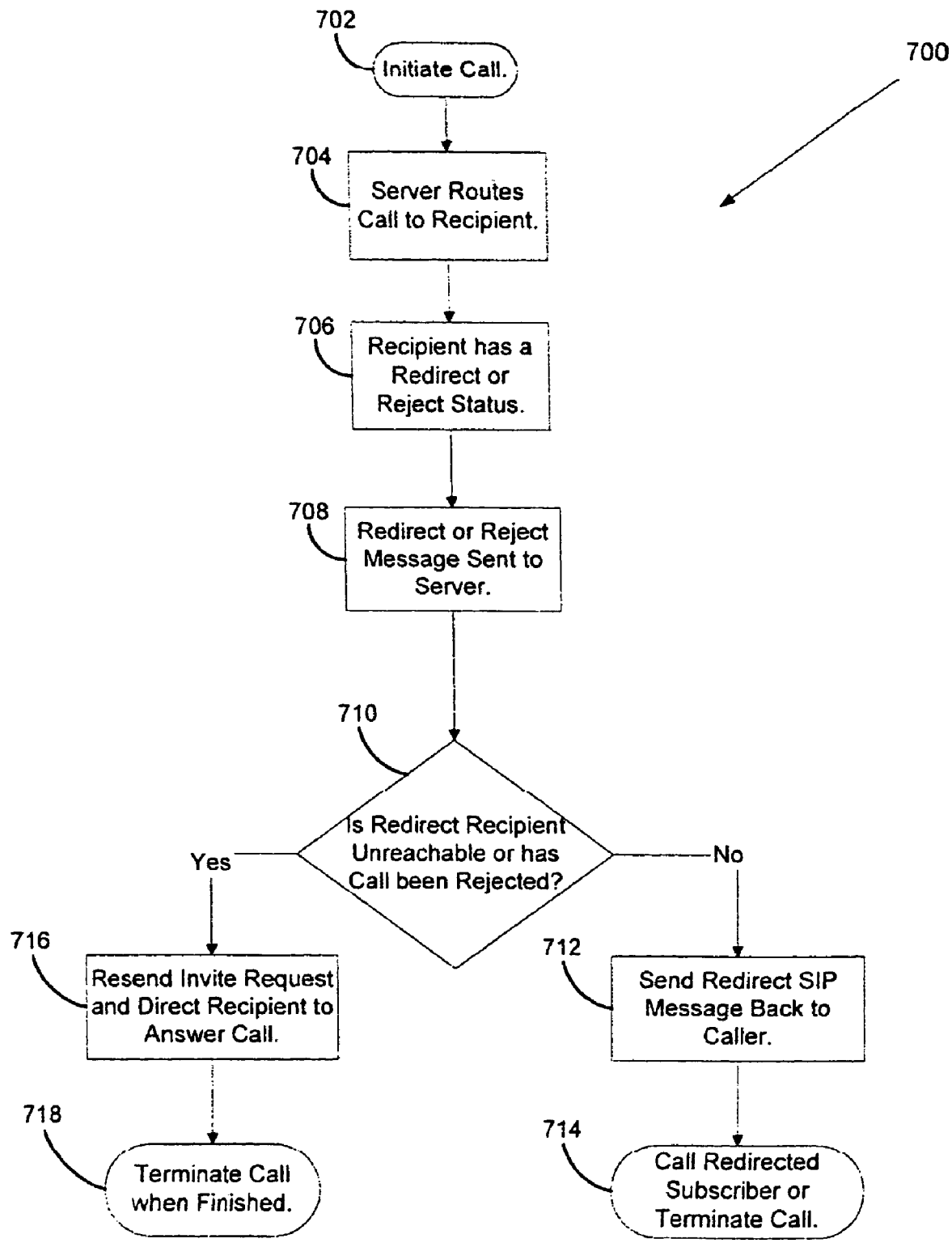
FIG. 7 shows a flow chart for a do not redirect or reject application in an embodiment of the present invention.

An embodiment of the present invention discusses how to overcome these disadvantages. With reference to FigS. 6 and 7, implementation of a Do Not Redirect or Reject application in an embodiment of the present invention is shown. Application 700 begins at state 702 when Alice at phone 600 initiates a call request 608 to Bob's phone 604. An example of this message is shown below.

---

INVITE sip: 555-xxxx-xxx2 @ 10.153.100.123 SIP/2.0
To: 555-xxxx-xx2<sip:15619231020 @ 10.153.100.123:5060;
user=phone>
From: <sip: 555-xxxx-xxx1 @ 10.152.67.102>;tag=test_tag_0008345221
Call-ID: 5919515411-8316973335595411-11-9184970552
Call-Info: Do Not Redirect or Reject
CSeq: 1235 INVITE
Contact: sip: 555-xxxx-xxx2 @ 10.152.67.102:5060
Via:SIP/2.0/UDP10.152.67.102:5060;branch=
z9hG4bK_brancha_0023412706
MaxForwards: 70
Content-Type: application/sdp
Content-Length: 257
Alert-Info: <Bellcore-dr1>
v=0
o=MxSIP 0 2075461554 IN IP4 10.153.100.101
s=SIP Call
c=IN IP4 10.153.100.101
t=0 0
m=audio 5004 RTP/AVP 0 8 18 101
a=rtpmap:0 PCMU/8000
a=rtpmap:8 PCMA/8000
a=rtpmap:18 G729/8000
a=rtpmap:101 telephone-event/8000
a=fmtp:101 0-15
a=ptime:20

---

In this message, the Call Info informs the server that this is a Do Not Redirect or Reject call. Sever 602 then routes the call to Bob the recipient at state 704. Bob has a redirect or reject status set on his phone 604 at state 706. Therefore, at state 708 a redirect or reject message is sent to server 602 giving a 302 temporarily moved message (or 4XX message indicating a rejection of the call) and instructing the caller to contact Carole 610.

Server 602 then determines if the redirect recipient, Carole at phone 606, is unreachable or if the call has been rejected by Bob at state 710. If the redirect recipient is reachable or if the call has not been rejected by Bob, then application 700 proceeds to state 712 where redirect SIP message similar to redirect SIP message 510 is sent to Alice. Alice can then decide to call Carole or terminate the call at state 714. If the redirect recipient is not available or the call has been rejected then sever 602 can resend invite request 612 directing Bob to answer the call at state 716. Bob's phone will then begin ringing 614 thus informing Alice with a ring that the call has been successful. When the call is finished it can be terminated at state 718.

Figure 8:
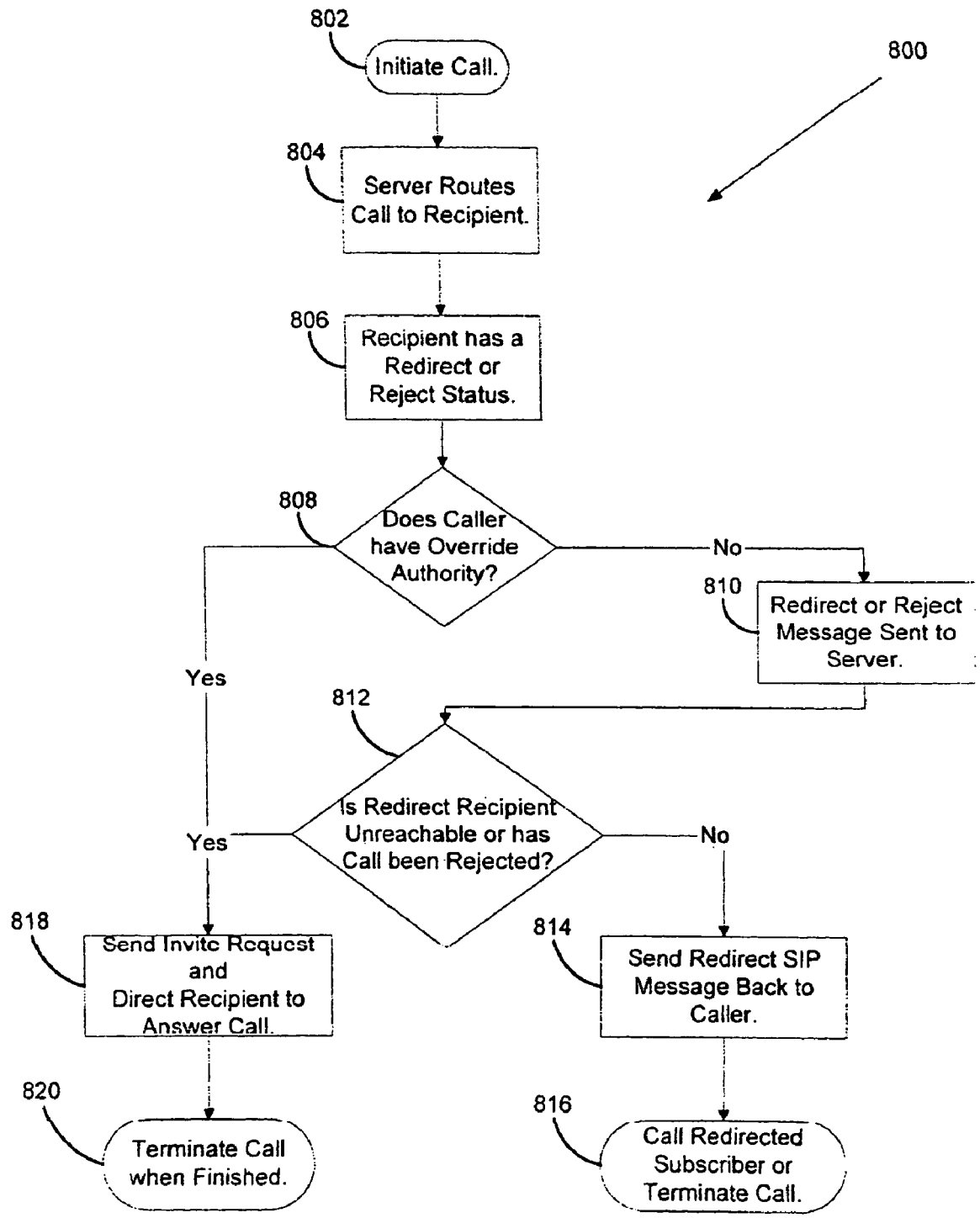
FIG. 8 shows a flow chart for a do not redirect or reject application in an embodiment of the present invention.

With reference to FIG. 8, implementation of a Do Not Redirect or Reject application in an embodiment of the present invention is shown. In this embodiment, application 800 begins at state 802 when Alice initiates a call to Bob 608.

The Call Info informs the server that this is a Do Not Redirect or Reject call. Sever 602 then routes the call to Bob the recipient at state 804. Bob has a redirect or reject status set on his phone 604 at state 806. At state 808 server 602 determines if Alice has redirect or reject override authority based upon Alice's priority or seniority. For example, if Alice was a senior level executive, then she could be given the authority at her discretion to override Bob's redirect or reject. If Alice does have override authority, then application 800 progresses to state 818 and sends an invite request directing Bob to answer the call. If Alice does not have override authority, then she progresses to state 810. At state 810 a redirect or reject message is sent to server 602 giving a 302 temporarily moved message (or 4XX message indicating a rejection of the call) and instructing the caller to contact Carole 610.

Server 602 then determines if the redirect recipient, Carole, is unreachable or if the call has been rejected by Bob at state 812. If the redirect recipient is reachable or if the call has not been rejected by Bob, then application 800 proceeds to state 814 where a redirect SIP message similar to SIP message 510 is sent to Alice. Alice can then decide to call Carole or terminate the call at state 816. If the redirect recipient is not available or the call has been rejected then sever 602 can resend invite request 612 directing Bob to answer the call at state 818. Bob's phone will then begin ringing 614 thus informing Alice with a ring that the call has been successful. When the call is finished it can be terminated at state 820.

It is fully contemplated that applications 700 and/or 800 can be held in memory 120 and executed by processor 125 on SIP Enabled Device 100. It is further contemplated that applications 700 and/or 800 could be executed by server 602 without departing from the spirit of the invention.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A do not redirect or reject call management system comprising:

a network server, said network server operating within a Session Initiation Protocol (SIP) network, said network server including:
a memory comprising:
a do not redirect or reject application that prevents a call recipient device from redirecting or rejecting a call; and
a processor coupled to the memory that executes the do not redirect or reject application,
wherein the call is placed on the SIP network, the call including a SIP request with a do not redirect or reject instruction, the SIP network including a caller device, the call recipient device and a redirect recipient device, the caller device, the call recipient device and the redirect recipient device in communication with said network server across said SIP network, the call recipient device associated with a first user and the redirect recipient device associated with a second user, the network server receives the call from the caller device and the network server directs the call to the call recipient device, the network server receives a redirect or reject instruction from the call recipient device and the network server determines if the redirect recipient device is reachable by sending another SIP request to the redirect recipient device and receiving a return of a SIP code from the redirect recipient device, the network server instructs the call recipient device to answer the call through the do not redirect or reject instruction that it must accept the call when the redirect recipient device is unreachable by receipt of the SIP code wherein the call recipient device will begin ringing, the network server routes the call to the redirect recipient device when the redirect recipient device is reachable.

2. The system of claim 1, wherein a do not redirect or reject instruction is present in a call request.

3. The system of claim 2, wherein the do not redirect or reject instruction is within a SIP header.

4. A method for preventing calls from being redirected or rejected executable by a network server of a Session Initiation Protocol (SIP) network, the method comprising the steps of:

receiving a call directed to a recipient device, the call including a SIP request with do not redirect or reject instructions;

routing the call through the SIP network, the SIP network including a caller device, the recipient device and a redirect recipient device, the caller device, the recipient device and the redirect recipient device In communication with said network server across said SIP network, the recipient device associated with a first user and the redirect recipient device associated with a second user;

receiving redirect or reject instructions from the recipient device;

determining it the redirect recipient device is available to take a redirected call by sending another SIP request to the redirect recipient device and receiving a return of a SIP code from the redirect recipient device;

redirecting the call when the redirect recipient device is available; and instructing the recipient device that it must accept the call when the redirect recipient device is unavailable by receipt of the SIP code based upon the do not redirect or reject instructions wherein the recipient device will begin ringing.

5. The method of claim 4, further comprising the step of sending the call directly to the recipient device and instructing the recipient device to answer the call based on a priority or seniority of the caller device.

* * * * *